(12) United States Patent
Bolik

(10) Patent No.: US 9,779,121 B2
(45) Date of Patent: Oct. 3, 2017

(54) TRANSPARENT ACCESS TO MULTI-TEMPERATURE DATA

(71) Applicant: Veit Bolik, Frankenthal (DE)

(72) Inventor: Veit Bolik, Frankenthal (DE)

(73) Assignee: SAP SE, Walldorf (DE)

(*) Notice: Subject to any disclaimer, the term of this patent is extended or adjusted under 35 U.S.C. 154(b) by 673 days.

(21) Appl. No.: 14/316,817

(22) Filed: Jun. 27, 2014

(65) Prior Publication Data

US 2015/0379056 A1 Dec. 31, 2015

(51) Int. Cl.
*G06F 17/30* (2006.01)

(52) U.S. Cl.
CPC .. *G06F 17/30315* (2013.01); *G06F 17/30153* (2013.01); *G06F 17/30584* (2013.01); *G06F 17/30595* (2013.01)

(58) Field of Classification Search
CPC ......... G06F 17/30153; G06F 17/30315; G06F 17/30584; G06F 17/30595
See application file for complete search history.

(56) References Cited

U.S. PATENT DOCUMENTS

| | | | |
|---|---|---|---|
| 5,515,531 A | 5/1996 | Fujiwara et al. | |
| 5,960,194 A | 9/1999 | Choy | |
| 9,235,590 B1* | 1/2016 | Wang | G06F 17/30153 |
| 2010/0106934 A1* | 4/2010 | Calder | G06F 3/0605 |
| | | | 711/173 |
| 2014/0122484 A1* | 5/2014 | Jagtiani | G06F 17/30339 |
| | | | 707/737 |

FOREIGN PATENT DOCUMENTS

EP 2660732 A1 11/2013

OTHER PUBLICATIONS

European Search Report with regard to family application EP 14 174 779.0 completed on Dec. 3, 2014 and issued on Dec. 15, 2014.

* cited by examiner

*Primary Examiner* — Dinku Gebresenbet
(74) *Attorney, Agent, or Firm* — Richardt Patentanwalte

(57) ABSTRACT

A system, a computer-implemented method, and a computer readable medium having stored thereon a computer executable program code for providing access to a database on the system. The database comprises entries stored across partitions. The system comprises a first storage device, a second storage device, and a computing device. The first storage device comprises one partition of the partitions. The second storage device comprises the other partitions except the one of the first storage device. Each of the partitions has a respective partition identification. Each of the entries comprises at least one data value indicative of allocation of the each of the entries in one of the partitions. Each of the entries is stored in one or more data rows of data tables stored in the database. Each of the data rows comprises a respective primary key for identification of that data row. The computing device comprises a memory storing processor-executable program code and a computer processor to execute the processor-executable program code in order to cause the computing device to perform the computer-implemented method.

15 Claims, 10 Drawing Sheets

Column-based storage of position table 110 as a series of contiguous (compressed) records
111a ⟶ {Order ID; O2; O2; O6; O7};
112a ⟶ {Position ID; Pos74; Pos75; Pos76; Pos77};
113a ⟶ {Product ID; Pr1; Pr2; Pr2; Pr3};
114a ⟶ {Amount; 1; 2; 3; 4};
115a ⟶ {Date closed; 0; 0; 0; 0};

Index table of the order table — 160

| Order ID | Customer ID | Partition number |
|---|---|---|
| O2 | C16 | 0 |
| O6 | C33 | 0 |
| O7 | C33 | 1 |
| O8 | C17 | 1 |
| O9 | C17 | 2 |

← 180
← 181
← 182
← 183
← 184

161  162  163

Index table of the position table — 170

| Order ID | Position ID | Product ID | Partition number |
|---|---|---|---|
| O2 | Pos74 | Pr1 | 0 |
| O2 | Pos75 | Pr2 | 0 |
| O6 | Pos76 | Pr2 | 0 |
| O7 | Pos77 | Pr3 | 1 |
| O8 | Pos78 | Pr1 | 1 |
| O9 | Pos79 | Pr2 | 2 |

301a
Store index rows across a first and second storage device, the index rows corresponding to the data rows stored on the first storage are stored on the first storage and the index rows corresponding to the data rows stored on the second storage are stored the second storage before the executing of any of the queries by primary key

301b
generate a counter for each of the index rows, wherein an initial counter value of each of the counters equals to zero

301c
executing/continuing executing queries by primary key, wherein
executing of each of the queries by primary key comprises increasing by unity of the counter value of the respective index row comprising the primary key specified in the each of the queries by primary key

301d
Does overall sum of the counter values exceed a threshold value ?

no — 301h
stetting all of the counter values to zero yes — 301e
identifying an index row set of index rows

301g
moving each of the index rows, which does not belong to the index row set, from the first storage to the second storage if the each of the index rows, which does not belong to the index row set, is stored on the first storage

301f
moving each of the index rows of the index row set from the second storage to the first storage if the each of the index rows of the index row set is stored on the second storage

Fig. 8

TRANSPARENT ACCESS TO MULTI-TEMPERATURE DATA

BACKGROUND OF THE DISCLOSURE

Field of the Disclosure

This disclosure relates to transparent access of data stored in databases comprising in-memory database.

Description of the Related Art

Data accessed/processed by various applications and/or services can be stored based on the age, importance, and/or any other factors related to the data in databases. For example, data that is important and/or frequently used, e.g., operation-relevant (or "hot") data can be stored in fast, expensive storage media that can be quickly accessed, whereas data that is less relevant or less-frequently accessed (or "cold" data) can be stored in a slow, less expensive storage media. The Hot data can occupy top levels of storage hierarchy so that it can be easily accessed. Data "temperature" ("hot" or "cold") can be assigned to the data based on usage, access, storage media, and/or any other factors.

The data can be stored redundantly at different levels of a storage hierarchy. However, it is preferable that only the hot data occupy top level(s) of storage hierarchy to save costs. After data temperature has been assigned to particular business object data and appropriate data storage location has been determined, the data can be appropriately queried/accessed. However, given the multiple temperatures of the stored data, it is difficult to determine how to optimally access the data at different storage levels, so that data queries load and/or process correct portions of "hot" and/or "cold" data.

Some conventional approaches to resolving this problem involve the user specifying whether cold data is to be considered or not. This is not feasible as the user typically is not aware of the temperature that has been assigned to the data and hence, is not able to identify whether cold data needs to be queried. This can lead to the end user not receiving the data the user requested (e.g., the user can be forced to re-run the query with a lower temperature delimiter), performance penalties due to unnecessarily evaluating data of higher I/O latency, and processing of a higher data volume. Another conventional approach requests application logic to derive the determination of whether hot/cold data needs to be queried and change all access coding, so that hot and/or cold data is queried explicitly. Such approach is implementation- and cost-prohibitive.

Thus, the conventional approaches failed to provide transparent data access that can avoid (content-wise) unnecessary data load and processing costs without placing a decision burden on end users or application developers in deciding whether data of lower temperatures should be accessed.

SUMMARY OF THE PRESENT DISCLOSURE

A computer-implemented technology for providing access to a database is described herein. As it will be clearly seen from the description herein this technology can reduce access time to the database by directing queries to a correct partition of the database. This process is implemented by generating a row store index of the database, wherein each data row of the database has a respective index row. As a result thereof access time to the database is reduced. Access time to the database is further reduced by storing the partitions on different storage devices having different access time. The partition containing "hot" data is stored on the first storage device having shorter access time than the second storage device, on which the rest of partitions are stored. At least a portion of the index rows is stored on the first data storage and the rest is stored on the second storage. Storing of the database across partitions and row store index across the first and the second data storage provides a unique opportunity for effective aging of data at two different time scales. For instance, moving data between partitions, when its "temperature" is changed, can be made in predetermined intervals of time because of big data volumes of data to be moved. Such operations may be performed on a weekly, monthly, annual, etc. time scale. On the other hand the most frequently used portion of index rows may be stored on the first storage and updated instantly. Since a data volume of the row sore index is much smaller than a data volume of the database, it may be stored in non-compressed way, while data compression is usually used for storing partitions of the database because of their big data volume.

Utilization of this scheme mentioned above can contribute to solving the following contradiction. Storing the database across partitions may be implemented according to a first set of criteria enabling optimum operation of a first group of programs, while optimum operation of a second group of programs requires storing the database across partitions according to a second set of criteria being in contradiction with the first set of the criteria. For instance programs like on-line On-Line Analytical Processing (OLAP) may prepare reports on an annual basis. Therefore it makes sense to split a data base comprising transactions in partitions on the annual basis as well. On the other hand programs like On-Line Transactional Processing (OLTP) may continue updating/monitoring at least a portion of the transactions for duration of more than one year on a daily basis. In order to avoid searching for transactions to be processed by OLTP in all partitions, a row store index can be used effectively. An OLTP application can identify first in the row store index one or more partitions where the requested by OLTP transactions are stored and afterwards search for the requested transactions.

The advantage of the proposed scheme may be illustrated on another simple example. For instance optimum performance of a first group of programs operating on the database comprising transactions requires splitting of database in partitions on an annual basis, i.e. each of the transactions is stored in a respective partition associated with a year when the each of the transactions is closed. The second group of programs prepares analysis and/or modifies all transactions generated for one or more clients. This activity of the one or more clients may extend over several years, therefore having the row store index helps to start a search in the partitions comprising needed transactions instead of searching through entire database.

It is an objective of embodiments of the invention to provide for a system configured to provide access to a database, a computer-implemented method for providing access to a database on the system, and a computer readable medium having stored thereon a computer executable program code for providing access to a database on the system. Advantageous embodiments are described in the dependent claims.

According to one embodiment, the present invention relates to a system comprising a first storage device, a second storage device, and a computing device. A database, containing entries, is stored across partitions. The first storage device comprises one partition of the partitions. The second storage device comprises the other partition(s) except the one of the first storage device. Each of the partitions has a respective partition identification for identification of that partition. Each of the entries comprises at least one data value indicative of allocation of the each of the entries in one of the partitions. Each of the entries is stored in one or more data rows of data tables stored in the database. Each of the data rows comprises a respective primary key for identification of that data row.

The computing device comprises: a memory storing processor-executable program code and a computer processor to execute the processor-executable program code in order to cause the computing device to: generate, for each of the primary keys, a respective index row comprising the respective primary key and the partition identification associated with said respective primary key; and execute a query by primary key on the database, wherein one of the primary keys is specified in the query by primary key.

The executing of the query by primary key comprises the following: identifying the partition identification associated with the specified primary key using the index rows; and executing a query by primary key on the partition having the identified partition identification using the specified primary key.

According to one embodiment, the execution of the processor-executable code by the computer processor further causes the computing device to modify the one or more indicative data values of the entry; and move the entry to the target partition if at least one data value indicative of allocation of the entry to be moved is modified and the at the least one modified data value indicates that the entry has to be moved to the target partition form the source partition in which it is currently stored, wherein all index rows comprising the respective primary keys of the data rows of the entry to be moved are updated after the entry to be moved is moved, wherein in each of the updated index rows the partition identification of the source partition is substituted by the partition identification of the target partition, wherein the source partition is one of the partitions and the target partition is another one of the target partitions.

According to one embodiment, the execution of the processor-executable code by the computer processor further causes the computing device to store at least a portion of the index rows on the first storage device, and storing all index rows, which are not stored on the first storage device, on the second storage device, wherein the index rows stored on the first storage device comply with an index allocation criterion, wherein the identifying of the partition identification associated with the specified primary key is performed using the index rows stored on the first storage device if the index rows stored on the first storage device comprise the specified primary key otherwise the identifying of the partition identification associated with the specified primary key is performed using the index rows stored on the second storage device.

According to one embodiment, the present invention relates to a computer-implemented method for providing access to a database on a system. The database, comprising entries, is stored across partitions. The system comprises a first storage device, a second storage device, and a computing device. The first storage device comprises one partition of the partitions. The second storage device comprises the other partition(s) except the one of the first storage device. Each of the partitions has a respective partition identification of that partition. Each of the entries comprises at least one data value indicative of allocation of the each of the entries in one of the partitions. Each of the entries is stored in one or more data rows of data tables stored in the database. Each of the data rows comprises a respective primary key for identification of that data row. The computing device comprises a memory storing processor-executable program code and a computer processor to execute the processor-executable program code in order to cause the computing device to perform the computer-implemented method.

The computer-implemented method comprises the following: generating, for each of the primary keys a respective index row comprising the respective primary key and the partition identification associated with said respective primary key; executing a query by primary key on the database, wherein one of the primary keys is specified in the query by primary key.

The executing of the query by primary key comprises the following: identifying the partition identification associated with the specified primary key using the index rows; and executing a query by primary key on the partition having the identified partition identification using the specified primary key.

According to one embodiment, the present invention relates to a computer readable medium having stored thereon a processor-executable program code for execution by a computer processor controlling a computing device of a system. The system comprises a first storage device, a second storage device, and the computing device. The database, comprising entries, is stored across partitions. The first storage device comprises one partition of the partitions. The second storage device comprises the other partition(s) except the one of the first storage device. Each of the partitions has a respective partition identification for identification of that partition. Each of the entries comprises at least one data value indicative of allocation of the each of the entries in one of the partitions. Each of the entries is stored in one or more data rows of data tables stored in the database. Each of the data rows comprises a respective primary key for identification of that data row. The computing device comprises a memory storing processor-executable program code and a computer processor to execute the processor-executable program code in order to cause the computing device to perform the computer-implemented method.

The computer-implemented method comprises the following: generating, for each of the primary keys, a respective index row comprising the respective primary key and the partition identification associated with said respective primary key; and executing a query by primary key on the database, wherein one of the primary keys is specified in the query by primary key.

The executing of the query by primary key comprises the following: identifying the partition identification associated with the specified primary key; and executing a query by primary key on the partition having the identified partition identification using the specified primary key.

In another embodiment the computer-implemented method further comprises storing at least a portion of the index rows on the first storage device, and storing all index rows, which are not stored on the first storage device, on the second storage device, wherein the index rows stored on the first storage device comply with an index allocation criterion, wherein the identifying of the partition identification associated with the specified primary key is performed using the index rows stored on the first storage device if the index rows stored on the first storage device comprise the specified primary key otherwise the identifying of the partition identification associated with the specified primary key is performed using the index rows stored on the second storage device.

In another embodiment the computer-implemented method further comprises: modifying the one or more indicative data values of the entry; and moving the entry to the target partition if at least one data value indicative of allocation of the entry to be moved is modified and the at the least one modified data value indicates that the entry has to be moved to the target partition form the source partition in which it is currently stored, wherein all index rows comprising the respective primary keys of the data rows of the entry to be moved are updated after the entry to be moved is moved, wherein in each of the updated index rows the partition identification of the source partition is substituted by the partition identification of the target partition, wherein the source partition is one of the partitions and the target partition is another one of the target partitions.

In another embodiment an access time of the first storage device is shorter than an access time of the second storage device.

In another embodiment each of some or all of the data tables are stored across partitions, wherein each of the tables being stored across partitions is split in table portions comprising the data rows stored in each of the partitions across which the each of the tables is stored, wherein the data tables are column store data tables, wherein each column of each of the data tables stored only in one of the partitions is stored as a contiguous compressed data record in the only one of the partitions, wherein each column of each of the table portions stored in the respective partition is stored as the contiguous compressed data record in the respective partition. The moving of the entries is performed only in predetermined non-overlapping time intervals. The moving of the entry from its source partition to its target partition comprises moving each data row of the entry to be moved from the respective source table being stored in said source partition and comprising the each data row to the respective target table being stored in said target partition. The respective source table comprising the each data row and the respective target table used for inserting of the each data row are table portions of one of the data tables being stored across at least said source and said target partition and comprising the each data row. The moving of the each data row comprises the following: decompressing each of the compressed contiguous data records corresponding to the columns of the source table; decompressing each of the contiguous compressed data records corresponding to the columns of the target table; moving each of data entities of the each data row from the respective decompressed data record of the source table to the respective decompressed data record of the target table, wherein the respective decompressed data record of the source table and the respective decompressed data record of the target table correspond to one of the columns of the one of the data tables and the one of the columns comprises the each of the data entities, wherein each of the columns of the one of the data tables comprises the respective data entity of the each data row, wherein the each data entity is the primary key, or a secondary key, or the data value; after the moving of the each of the data entities compressing each of the decompressed contiguous data records corresponding to the columns of the source table; and after the moving of the each of the data entities compressing each of the decompressed contiguous data records corresponding to the columns of the target table.

In another embodiment the index rows are stored in index tables. The index tables are row store tables. Each of the data rows and its corresponding index row comprise the identical primary key. Each row of each of the index tables is stored as a contiguous data record. Each of the index tables has the respective data table comprising an identical set of the primary keys as the each of the index tables. The index allocation criterion is selected from a group consisting of the following index allocation criteria a)-c):

a) All index rows are stored on the first storage device;
b) The index rows corresponding to the data rows stored on the first storage device are stored on the first storage device and the index rows corresponding to the data rows stored on the second storage device are stored on the second storage device, wherein each of the index tables having a portion of the index rows stored on the first storage device and another portion of the index rows stored on the second storage device is stored across the first and second storage device, wherein the moving of the each data row further comprises moving of the contiguous data record of the respective index row comprising the same primary index as the each data row from the first storage device to the second storage device if the each data row is moved from the first storage device to the second storage device, wherein the moving of the each data row further comprises moving of the contiguous data record of the respective index row comprising the same primary index as the each data row from the second storage device to the first storage device if the each data row is moved from the second storage device to the first storage device, wherein the index table comprising the respective index row is stored across the first storage device and the second storage device;
c) The index rows corresponding to the data rows stored on the first storage device are stored on the first storage device and the index rows corresponding to the data rows stored on the second storage device are stored the second storage device before the executing of any of the queries by primary key, wherein each of the index tables having a portion of the index rows stored on the first storage device and another portion of the index rows stored on the second storage device is stored across the first and second storage device, wherein the computer-implemented method further comprises: generating a counter for each of the index rows, wherein an initial counter value of each of the counters equals to zero, wherein the executing of each of the queries by primary key further comprises increasing by unity of the counter value of the respective index row comprising the primary key specified in the each of the queries by primary key; and after an overall sum of the counter values exceeds a threshold value perform the following: identifying an index row set of index rows, wherein each of the index rows of the index row set has the respective counter value higher than any of the counter values of the counters of the index rows, which do not belong to the index row set, and a data volume of the index row set is below a threshold data volume; moving each of the index rows of the index row set from the second storage device to the first storage device if the each of the index rows of the index row set is stored on the second storage device; moving each of the index rows, which does not belong to the index row set, from the first storage device to the second storage device if the each of the index rows, which does not belong to the index row set, is stored on the first storage device; and after the identifying of the index row set stetting all of the counter values to zero.

In another embodiment each of some or all of the data rows comprises one or more secondary keys. Each of the secondary keys identifies a respective data row set of the data rows. Each of the index rows of the respective primary key further comprises all secondary keys of the data row comprising the respective primary key if the data row comprising the respective primary key comprises at least one of the secondary keys. The computer-implemented method further comprises: executing a query by secondary key on the database, wherein one of the secondary keys is specified in the query by secondary key, wherein the executing of the query by secondary key comprises: identifying all of the partition identifications stored in the index rows comprising the specified secondary key; and executing a query by secondary key on all of the partitions having their partition identification identified using the specified secondary key.

In another embodiment the index rows are stored in index tables. The index tables are row store tables. Each of the data rows and its corresponding index row comprise the identical primary key. Each row of each of the index tables is stored as a contiguous data record. Each of the index tables has the respective data table comprising an identical set of the primary keys as the each of the index tables. The index allocation criterion is selected from a group consisting of the following index allocation criteria a)-c):

a) all index rows are stored on the first storage device;
b) the index rows corresponding to the data rows stored on the first storage device are stored on the first storage device and the index rows corresponding to the data rows stored on the second storage device are stored on the second storage device, wherein each of the index tables having a portion of the index rows stored on the first storage device and another portion of the index rows stored on the second storage device is stored across the first and second storage device, wherein the moving of the each data row further comprises moving of the contiguous data record of the respective index row comprising the same primary index as the each data row from the first storage device to the second storage device if the each data row is moved from the first storage device to the second storage device, wherein the moving of the each data row further comprises moving of the contiguous data record of the respective index row comprising the same primary index as the each data row from the second storage device to the first storage device if the each data row is moved from the second storage device to the first storage device, wherein the index table comprising the respective index row is stored across the first storage device and the second storage device;
c) the index rows corresponding to the data rows stored on the first storage device are stored on the first storage device and the index rows corresponding to the data rows stored on the second storage device are stored on the second storage device before the executing of any of the queries by primary key, wherein each of the index tables having a portion of the index rows stored on the first storage device and another portion of the index rows stored on the second storage device is stored across the first and second storage device, wherein the execution of the processor-executable code by the computer processor further causes the computing device to: generate a counter for each of the index rows, wherein an initial counter value of each of the counters equals to zero, wherein the executing of each of the queries by primary key further comprises increasing by unity of the counter value of the respective index row comprising the primary key specified in the each of the queries by primary key; and after an overall sum of the counter values exceeds a threshold value perform the following: identifying an index row set of index rows, wherein each of the index rows of the index row set has the respective counter value higher than any of the counter values of the counters of the index rows, which do not belong to the index row set, and a data volume of the index row set is below a threshold data volume; moving each of the index rows of the index row set from the second storage device to the first storage device if the each of the index rows of the index row set is stored on the second storage device; moving each of the index rows, which does not belong to the index row set, from the first storage device to the second storage device if the each of the index rows, which does not belong to the index row set, is stored on the first storage device; and after the identifying of the index row set stetting all of the counter values to zero.

In another embodiment each of some or all of the data rows comprises one or more secondary keys. Each of the secondary keys identifies a respective data row set of the data rows. Each of the index rows of the respective primary key further comprises all secondary keys of the data row comprising the respective primary key if the data row comprising the respective primary key comprises at least one of the secondary keys. The execution of the processor-executable code by the computer processor further causes the computing device to: execute a query by secondary key on the database, wherein one of the secondary keys is specified in the query by secondary key, wherein the executing of the query by secondary key comprises: identifying all of the partition identifications stored in the index rows comprising the specified secondary key; and executing a query by secondary key on all of the partitions having their partition identification identified using the specified secondary key.

In another embodiment the index rows stored on the first storage are searched first in order to identify the partition identification associated with the primary key specified in the query by primary key. If the index rows stored on the first storage do not comprise said primary key then the index rows stored on the second storage are searched in order to identify the partition identification associated with the primary key specified in said query by the primary key.

In the aforementioned embodiments and in the following detailed description the partition identification is a code used for identification of the partitions. Each of the partition identifications uniquely identifies only one respective partition. Each of the partitions has the respective partition identification being different from partition identifications of the other partitions. For instance, partitions can be numbered, as it will be described in the detailed description.

In the aforementioned embodiments and in the following detailed description the primary key is a code used for identification of the data rows. The code can be for instance one or more number, one or more text words, or one or more combinations of text symbols and digits. Each of the primary key uniquely identifies only one respective data rows. Each of the data rows has the respective primary key being different from the primary keys of the other data rows. Execution of query by primary key returns only one data row comprising the primary key specified in the query by primary key if the data base comprises said data row, otherwise the execution of said query by primary key delivers no data rows. Examples of the primary keys will be illustrated in the detailed description.

In the aforementioned embodiments and in the following detailed description the secondary key is a code used for identification of the respective set of data rows. The code can be for instance one or more number, one or more text words, or one or more combinations of text symbols and digits. Execution of query by secondary key returns all data rows of the respective set, if the data base comprises said set, otherwise the execution of said query by secondary key delivers no data rows, wherein each data row of said set comprises the secondary key specified in said query by secondary key. Examples of the secondary keys will be illustrated in the detailed description.

BRIEF DESCRIPTION OF THE DRAWINGS

FIG. 5 is illustrates the index rows of the example database after update.
FIG. 8 is a flow chart of a method for storing frequently used index rows on a first storage.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

Figure 1:
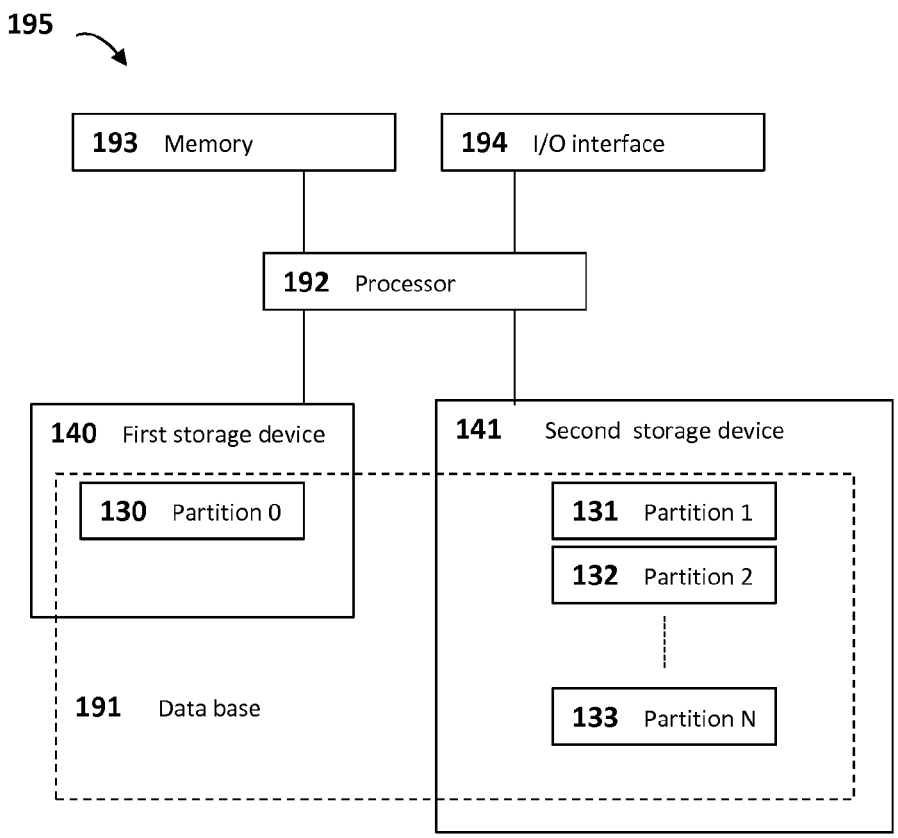
FIG. 1 is a block diagram of a system.

FIG. 1 illustrates a an exemplary system 195 that can provide a transparent access to a data base 191 stored across partitions "Partition 0"-"Parition N" 130-133. The system comprises a first storage device 140 and a second storage device 141. "Partition 0" is stored on the first storage device, while all other partitions "Partition 1"-"Partition N" are stored on the second storage device. In another implementation the partitions may be stored across the first and the second storage device in an arbitrary way. For instance, "Partition 0", "Partition 1", and "Partition 2" are stored on the first storage device and all other partitions "Partition 3"-"Partition N" are stored on the second storage device. The first storage device has a shorter access time than the second storage device. The first storage device may be implemented using Dynamic Random Access Memory (DRAM) and/or Static Random Access Memory (SRAM), while the second storage device may be implemented using one or more Hard Disk Drives (HDD) and/or one or more Solid State Drives (SSD). When the first and the second storage device are implemented as described above, then the first storage device comprises as usual only one of the partitions, because of the cost limiting factors determining that the first storage device is smaller than the second storage device. In this case storing a portion of the data base across several partitions on the first storage device may not result in acceleration of access to the data of the database stored on the first storage device. It will be necessary to search for required data in said several partitions having much smaller sizes in comparison to the partitions stored on the second storage device, while said several partitions united in one on the first storage device can be effectively searched as one massive of data. The single partition on the first storage device can be implemented as in-memory data base. The system further comprises a computing device. The computing device comprises a memory 193 storing processor-executable program code, and a computer processor (192) to execute the processor-executable program code in order to cause the computing device to provide access to the data base, to perform updates of the database, to execute query or a request to obtain specific data (e.g. query by primary key, query by secondary key), and to move entries of the database between the partitions. The queries may be formulated using the structured query language (SQL). The processor is communicatively coupled to the memory, the first storage device, and the second storage device. The processor may be further communicatively coupled to the I/O interface 194 for communicating with users and/or other computing devices/systems.

The database 191 may comprise any query-responsive data sources, e.g., an SQL relational database management system. In some implementations, the data source can include a relational database, a multi-dimensional database, an eXtendable Markup Language ("XML") document, or any other data storage system storing structured and/or unstructured data. The data stored in the database 191 can be distributed among several relational databases, warehouses, multi-dimensional databases, and/or any other data sources, and/or any combinations thereof. The data source can include one or more On-Line Analytical Processing ("OLAP") databases, spreadsheets, text documents, presentations, etc. Further, the database may comprise tabular data, row-based data stored in row format, column-based data stored in columnar format, and object-based data. Data of the database can be indexed and/or selectively replicated in an index to allow fast searching and retrieval.

In some implementations, the current subject matter system can retrieve business object data or any other data from the database in response to queries based on various selection criteria or parameter(s) which can have a correlation to time-based criteria that can be used for partitioning. In a typical access pattern, a date restriction or a status restriction can be used. A status restriction can be part of logic for separating hot data from cold data, which is discussed below. The date restriction can include criteria to partition the hot data from the cold data as well as partition the cold data sorted on the second storage device itself.

Each of the partitions has a respective partition identification. Each of the entries of the database comprises at least one data value indicative of allocation of the each of the entries in one of the partitions. Each of the entries is stored in one or more data rows of data tables stored in the database. Each of the data rows comprises a respective primary key for unique identification of the each of the data rows in the database. Each of some or all of the data rows comprises one or more secondary keys. Each of the secondary keys identifies a respective data row set of the data rows. Each of some or all of the data rows comprises data values.

Each of some or all of the data tables are being stored across at least two partitions. Each of the tables being stored across partitions is split in table portions comprising the data rows stored in each of the partitions across which the each of the tables is stored. Each of the table portions of the same table have the same table metadata describing the data table, i.e. names of the columns, sequence of the columns in the table, etc. The data tables are column store data tables. Each column of each of the data tables stored only in one of the partitions is stored as a contiguous compressed data record in the only one of the partitions. Each column of each of the table portions stored in the respective partition is stored as the contiguous compressed data record in the respective partition. Various data compression methods may be used for the contiguous data records of the data tables. Any entry of the database can be moved between partitions when one or more indicative data values of the any entry is modified. For instance, moving of the entries between partitions may be executed in the framework of aging of data, when the status of a portion of the entries is changed from "hot" to "cold".

Figure 2A:
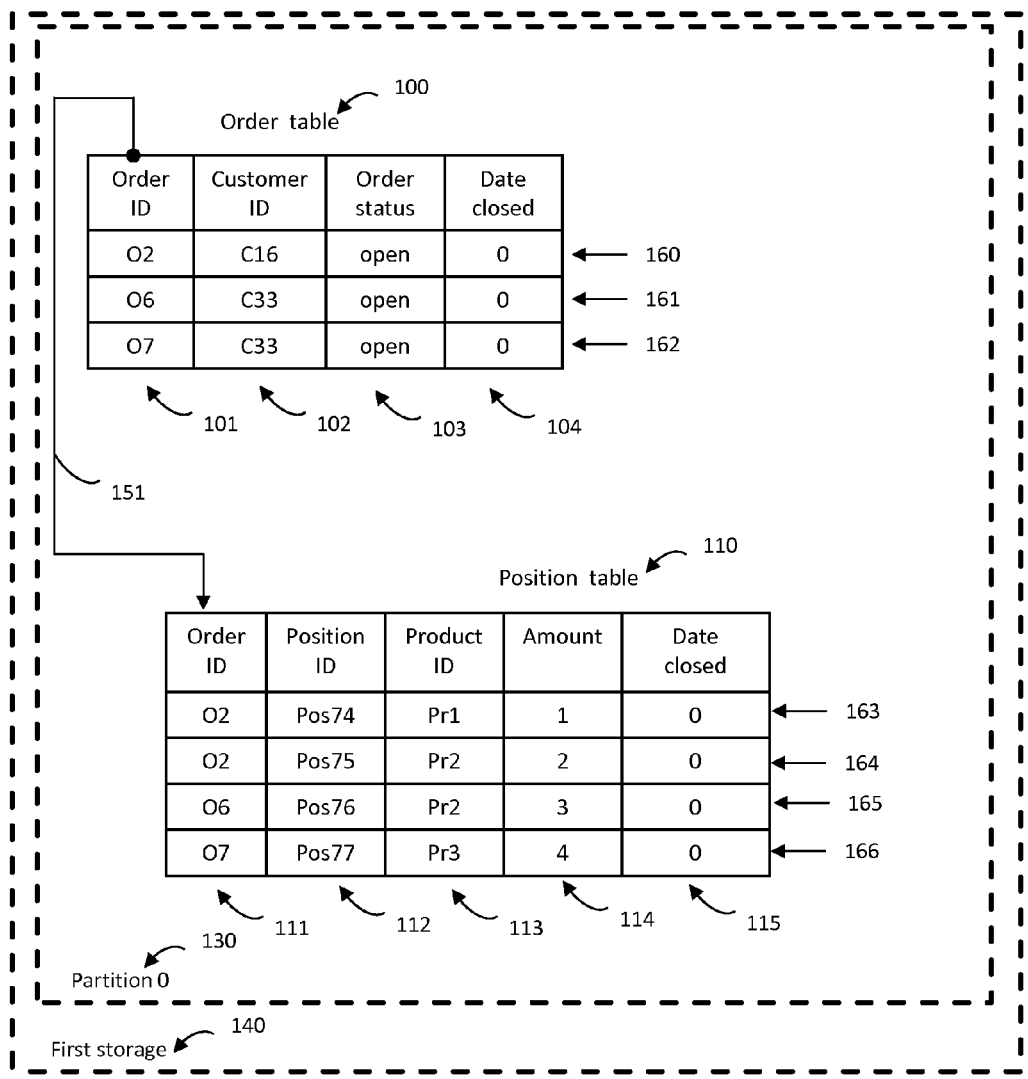
FIG. 2*a, b* is an example database stored across partitions.
Figure 2B:
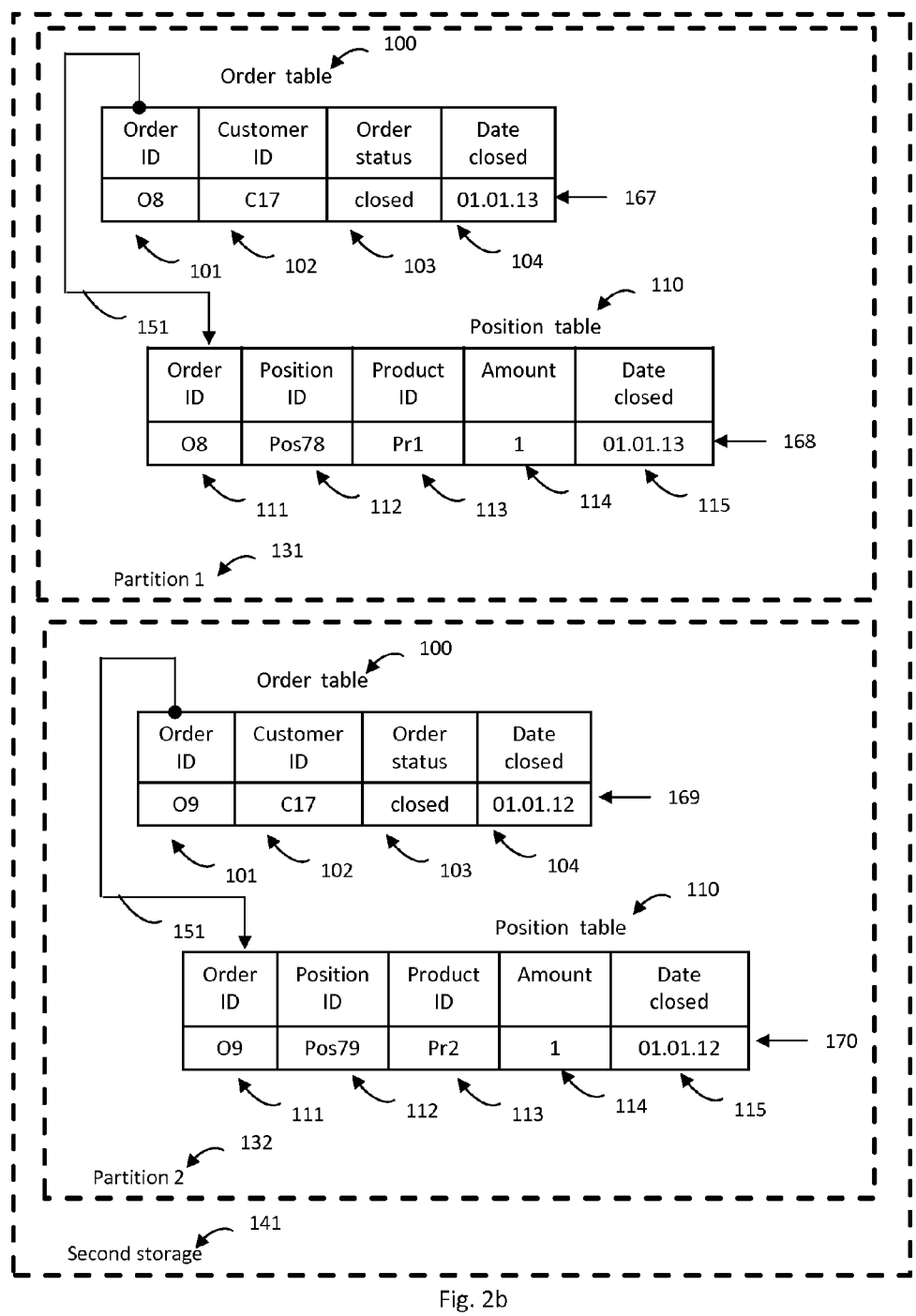

FIGS. 2a and 2b illustrate an example database corresponding to the general description of the database mentioned above. The example data base is stored across 3 partitions 0-2 130-132. The "Partition 0" is stored on the first storage device 140 and comprises "hot" data/entries. "Partition 1" and "Partition 2" are stored on the second storage device 141 and comprise "cold" data/entries. The data base comprises "Oder table" 100 and "Position table" 110. Both of the data tables are stored across 3 partitions. The rows 160, 161, and 162 of the data table 100 are stored in the "Partition 0". The row 167 of the data table 100 is stored in the "Partition 1" and the row 169 of the data table 100 is stored in the "Partition 2". The rows 163-166 of the data table 110 are stored in the "Partition 0". The row 168 of the data table 110 is stored in the "Partition 1" and the row 170 of the data table 110 is stored in the "Partition 2".

The "Order table" 100 represents a list of purchase orders. The "Position table" represents details of purchase orders. The "Order table" has 4 columns "Order ID", "Customer ID", "Order Status", and "Date closed". The "Order ID" column comprises order specifications 101 being primary keys for unique identification of each of the orders/entries in the database. The "Customer ID" column comprises customer identifications 102 being secondary keys for identification of a set of orders for each of the customers. The column "Order status" comprises data values 103 being indicative whether the order is closed or not, e.g. whether the products are delivered to customer or not. The column "Data closed" comprises dates when the orders are closed. If the order is not closed then the value in the column "Date closed" equals to 0. Each of the orders/entries has a respective unique row 160, 161, 162, 167, and 169 in the data table 100.

The "Position table" 110 comprises 5 columns "Order ID", "Position ID", "Product ID", "Amount", and "Date closed". The column "Order ID" in the data table 110 comprises customer identifications being secondary keys 111 for identification of sets of products of each of the orders/entries in the database. The column "Position ID" comprises position identifications 112 being primary keys for deification of each of the order position in the data table 110. The column "Product ID" comprises product identifications 113 being secondary keys for identification of sets of identical products in the data table 110. The column "Amount" comprises data values 114 specifying amount of products ordered in each of the positions. The column "Date closed" of the data table 110 comprises dates when the orders are closed. If the order is not closed then the value in the column "Date closed" equals to 0. Each of the positions in the data table 110 has a respective unique row 163-166, 168, 170.

The values in the columns "Date closed" are used as indicative data values for storing the data rows of data tables 110 and 100 across partitions. If the value in the column "Date closed" equals to 0, then the data row comprising this value is stored in the "Partition 0". If the order is closed in a year 2013, then the data row comprising this value is stored in the "Partition 1". If the order is closed in a year 2012, then the data row comprising this value is stored in the "Partition 2". The columns "Order ID" in the data tables 100 and 110 are linked by a foreign key relationship 151.

Data table portions of the data tables 100 and 110 are stored column wise in each of the respective partitions. Each of the columns of each of the data table portions is stored as a contiguous data record in the respective partition. Data compression may be applied to each of the data records. For instance, the portion of the data table 110 is stored in the "Partition 0" as series of contiguous data records 111a, 112a, 113a, 114a, 115a (FIG. 2a).

Figure 3:
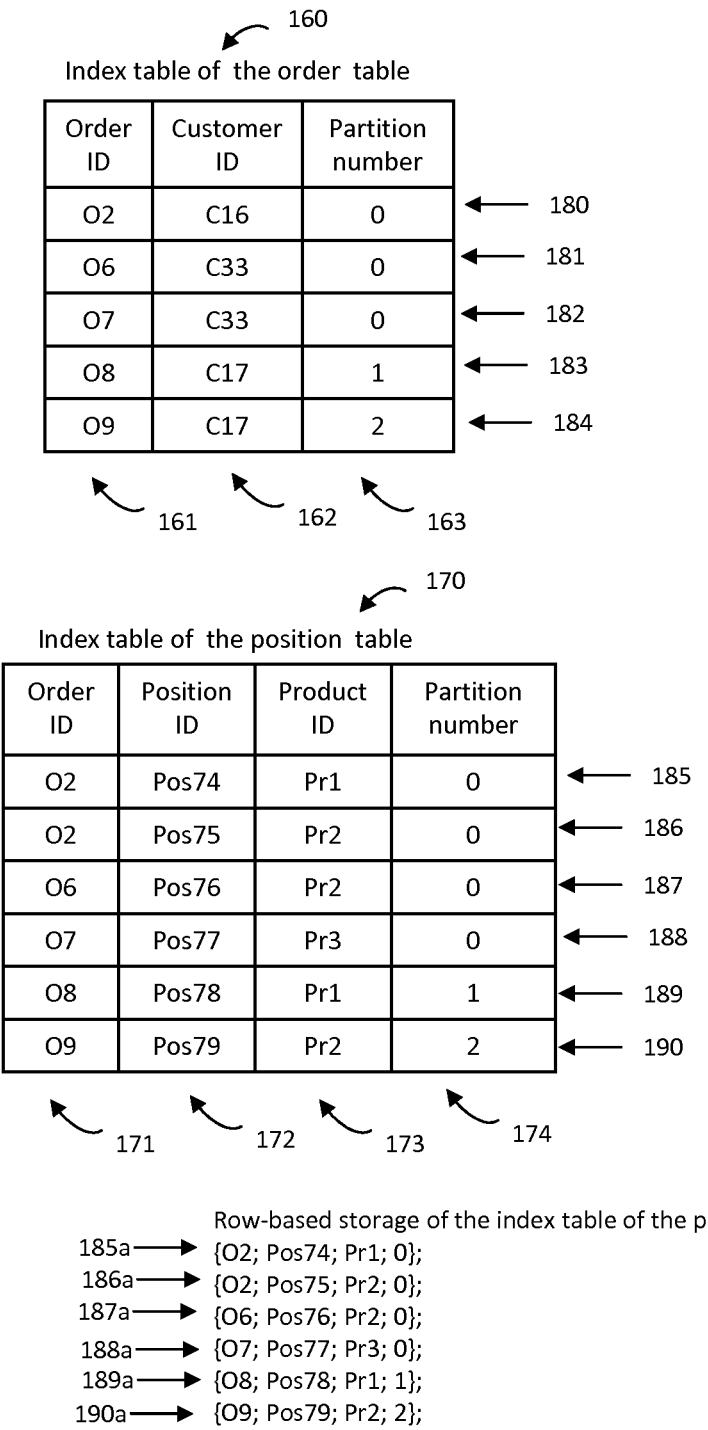
FIG. 3 illustrates index rows of the example database.

In order to facilitate access to the database, e.g. to execute queries by primary or secondary key not on entire database but only on partitions comprising data rows having primary keys or secondary keys specified in the queries, a row store index is generated. Index tables comprising index rows are illustrated on FIG. 3. Each data table of the database has a respective index table. The "order table" 100 has the respective "index table of the order table" 160. The "position table" 110 has the respective "index table of the position table" 170. Each data row has the respective index row and both rows comprise the same primary key (101, 161; 111, 171). Each of the index tables further comprises all secondary keys of the respective data row (102, 162; 112, 172; 113, 173) and the partition number (163, 174) of the respective data row. The pairs of the data rows and their respective index rows are listed as follows: 160, 180; 161, 181; 162, 182; 163, 185; 164, 186; 165, 187; 166, 188; 167, 182; 168, 189; 169, 184; 170, 190. The index rows of each of the index tables are stored row wise as contiguous data records. For instance, the index rows of the table 170 are stored as the contiguous data records 185a, 186a, 187a, 188a, 189a, 190a (FIG. 3).

Figure 4A:
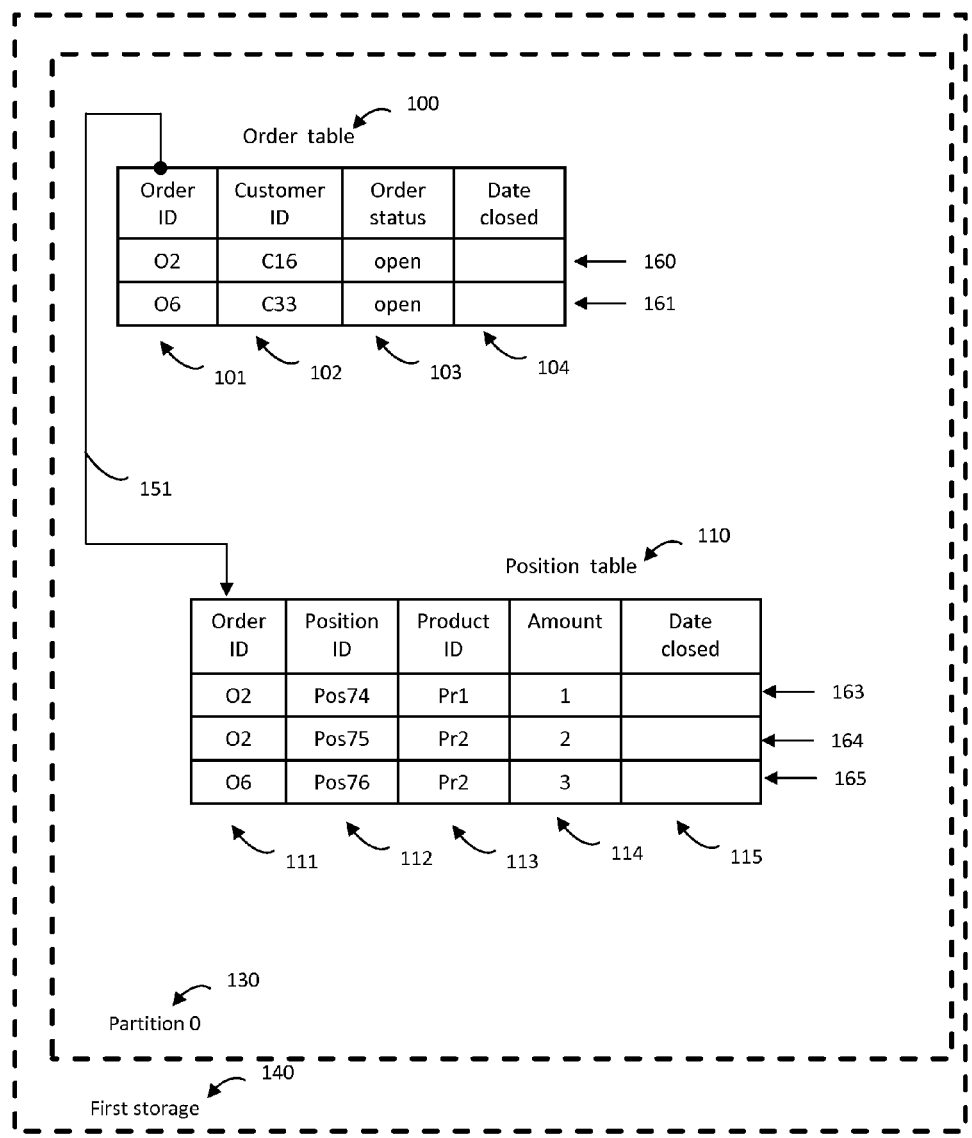
FIG. 4*a, b* is the example database after update.
Figure 4B:
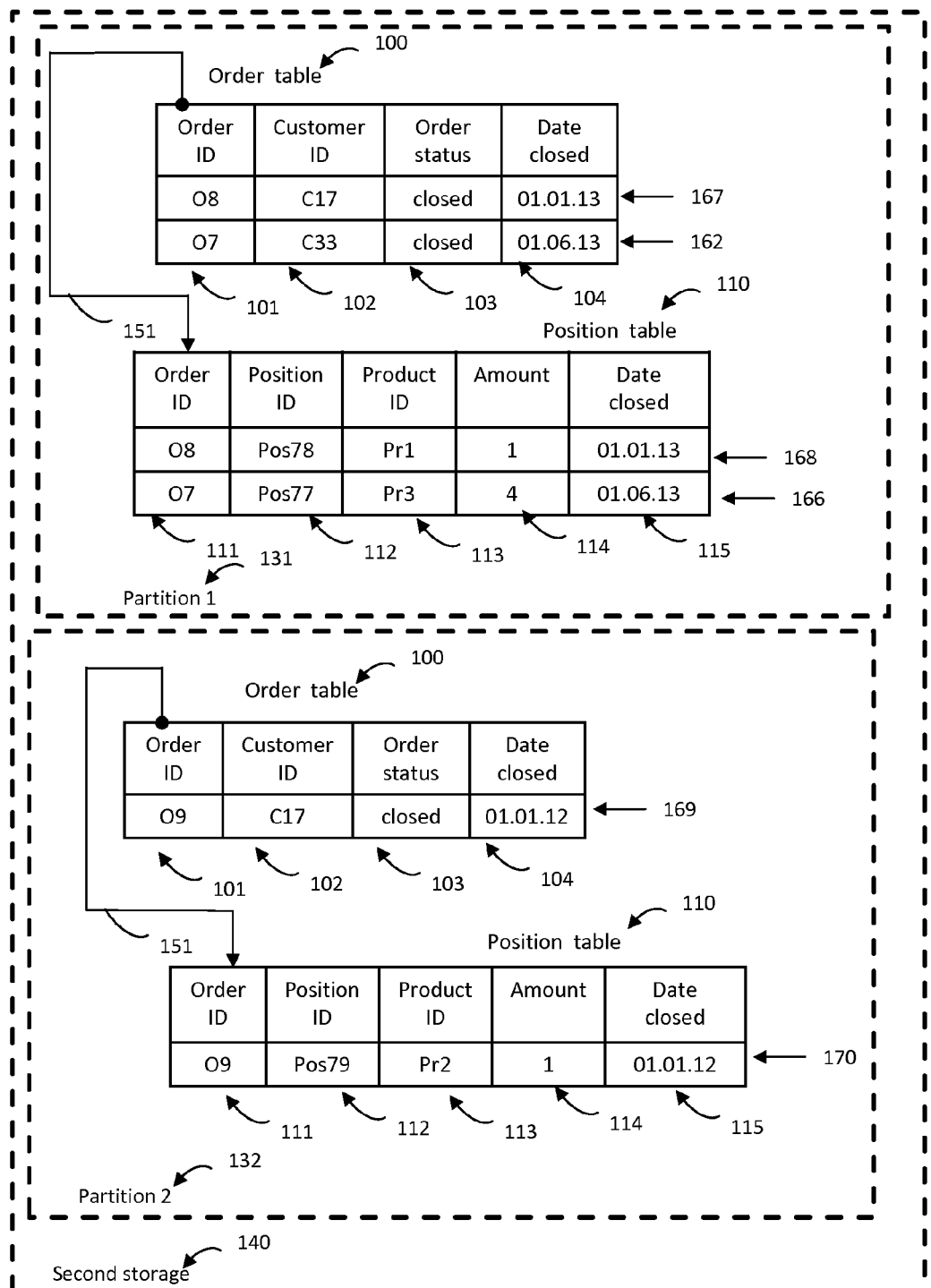

FIGS. 4a and 4b illustrated the example database after completion of the order "O7". The order was closed on 01.06.13. Since the column "Date closed" comprises data values being indicative for allocation of the entry in one of the partitions and the aforementioned allocation criterion indicates that the entry of order "O7" has to be moved to the "Partition 1", the row 162 is moved from a table portion of the data table 100 in the "Partition 0" to a table portion of the data table 100 in the "Partition 1" and the row 166 is moved from a table portion of the data table 110 in the "Partition 0" to a table portion of the data table 110 in the "Partition 1".

FIG. 5 illustrate a corresponding change in the index tables after the change in the database depicted on the FIGS. 4a and 4b. Since the row 162 is moved to the "Partition 1" the partition number in the respective index row 182 is updated accordingly. Since the row 166 is moved to the "Partition 1" the partition number in the respective index row 188 is updated accordingly.

Figure 6:
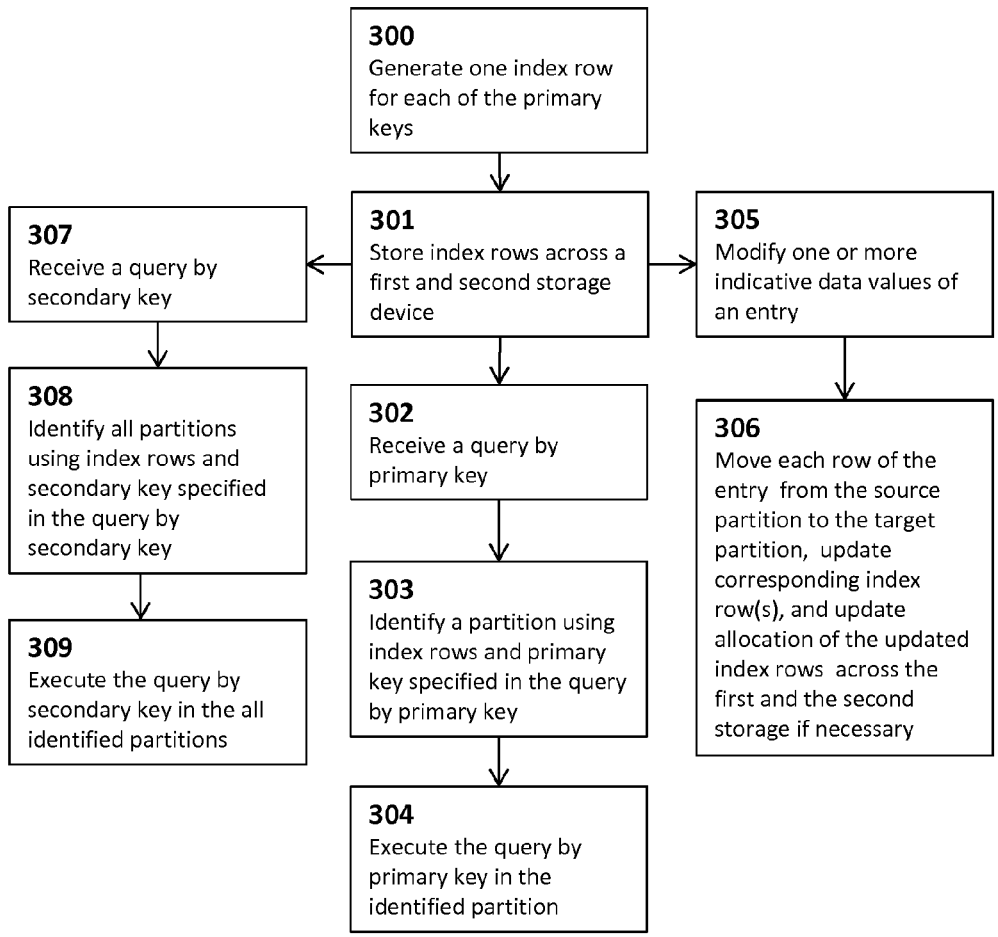
FIG. 6 is a flow chart of a method for providing access to a database on a system.

FIG. 6 illustrates a flow chart of a computer-implemented method for providing access to the database 191 on the system 195. In a process block 300 one index row for each of the primary keys of the data rows in the database is generated. Each of the index rows comprises the respective primary key and the partition identification associated with said respective primary key. Each of the primary keys of the respective data row is associated with the partition name of the partition in which said respective data row is stored. An example of execution of this process block is depicted on the FIG. 3 described above.

In a process block 301 at least a portion of the generated index rows is stored on the first storage device and the rest of the generated index rows are stored on the second storage device. The index rows stored on the first storage device comply with an index allocation criterion. Details regarding splitting of the index rows between the first and the second index storage will be discussed further on.

After execution of the process block 301 various processes may be executed. The choice of a particular process depends on particular task being executed by an application operating on the database. The branch of process blocks 302-304 is used for execution of a query by primary key. The branch of process blocks 305 and 306 is used for moving an entry from one partition to another. The branch of process blocks 307-309 is used for execution of a query by the secondary key.

In the process block 302 a query by primary key is received. One of the primary keys is specified in the query by primary key. In the process block 303 the partition identification associated with the specified primary key using the index rows stored on the first storage device is identified if the index rows stored on the first storage device comprise the specified primary key, otherwise the partition identification associated with the specified primary key using the index rows stored on the second storage device. In the process block 304 the query by primary key is executed on the partition having the identified partition identification using the specified primary key.

Execution of the process blocks 302-304 may be illustrated on the following example using the example database depicted in the FIGS. 2a and 2b. For instance, the primary key "O2" is specified in the query by primary key. When this query is received in the process block 302, the partition identification "O" associated with the primary key "O2" is identified using index row 180 of the index table 160 on the FIG. 3 in the process block 303. Afterwards in the process block 304 the query by the primary key "O2" is executed in the "Partition 0" and delivers the row 160.

In the process block 307 a query by secondary key is received. One of the secondary keys is specified in the received query by secondary key. In the process block 308 all of the partition identifications stored in the index rows comprising the specified secondary key are identified. In the process block 309 the query by secondary key is executed in all of the partitions having their partition identification identified using the specified secondary key.

Execution of the process blocks 307-309 may be illustrated on the following example using the example database depicted in the FIGS. 2a and 2b. For instance, the secondary key "C17" is specified in the query by secondary key. When this query is received in the process block 307, the partition identifications "1" and "2" associated with the secondary key "C17" are identified using index rows 183 and 184 of the index table 160 on the FIG. 3 in the process block 308. Afterwards in the process block 307 the query by the secondary key "C17" is executed in the "Partition 1" and in the "Partition 2" and delivers the rows 167 and 169.

In the process bock 305 one or more indicative data values of the entry are modified. The indicative data values are data values determining allocation of the respective entries in one of the partitions. In the process block 306 the entry is moved to the target partition if at least one data value indicative of allocation of the entry to be moved is modified and the at the least one modified data value indicates that the entry has to be moved to the target partition form the source partition in which it is currently stored, wherein all index rows comprising the respective primary keys of the data rows of the entry to be moved are updated after the entry to be moved is moved. In each of the updated index rows the partition identification of the source partition is substituted by the partition identification of the target partition. The source partition is one of the partitions and the target partition is another one of the target partitions.

Execution of the process blocks 305 and 306 is illustrated above in the example when order "O7" is closed.

Figure 7:
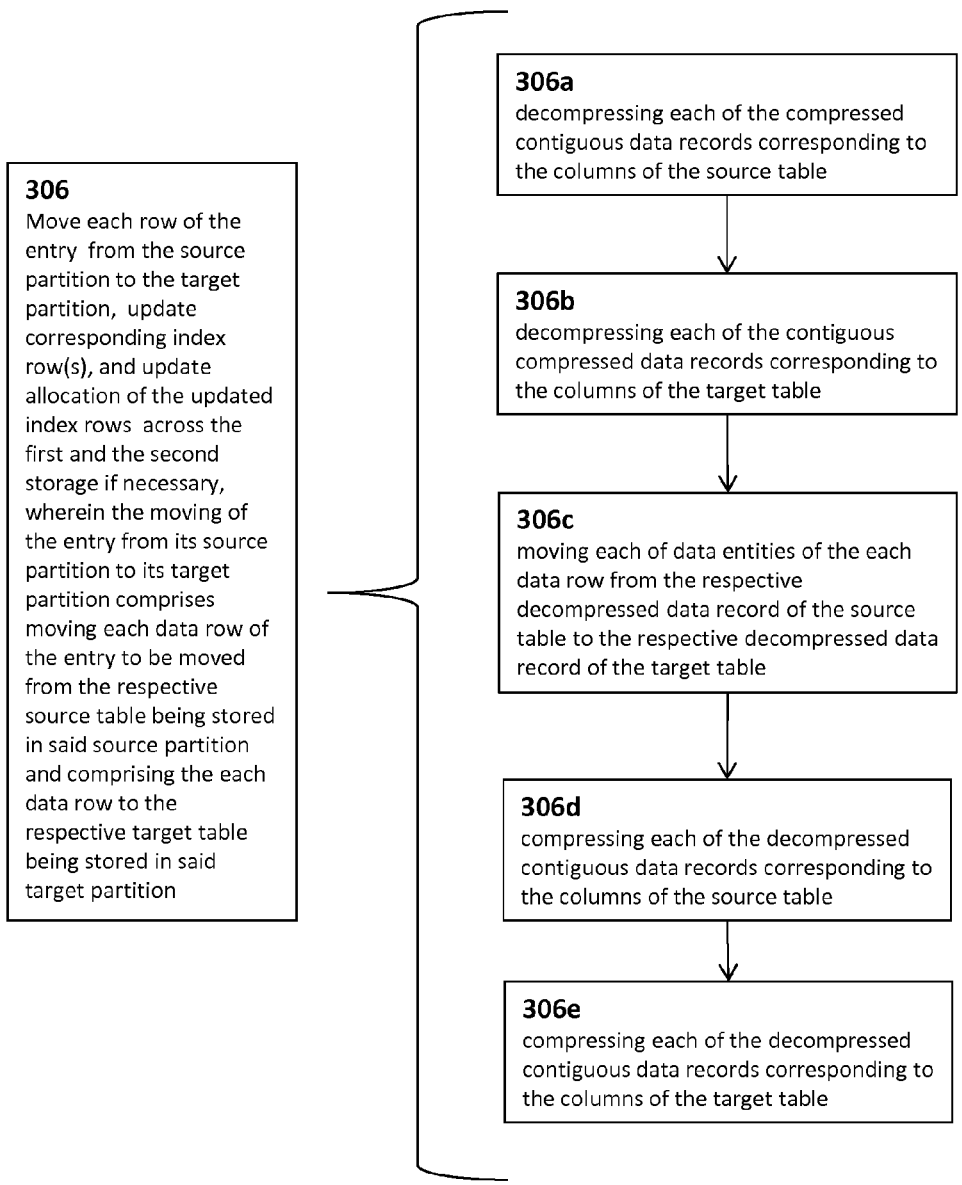
FIG. 7 is a flow chart of a method for moving entries between partitions.

The data tables stored in the data base may be stored in a column store way, wherein each column of each table portion (or a complete data table) stored in one or the partitions is stored as a contiguous data record. Further each of the contiguous data records may be stored in the compressed way. This way of data storing has advantages because data compression saves storage space and storing of data tables in a column store way is beneficial for analytical tools operating on columns of data such as OLAP. On the other hand moving of data entries from one partition to another requires a special computer-implemented method depicted on FIG. 7. Since executing of this method may require substantial computing resources it may be executed only in predetermined non-overlapping time intervals. As it is mentioned in an extended version of the process block 306 on the FIG. 7 the moving of the entry from its source partition to its target partition comprises moving each data row of the entry to be moved from the respective source table being stored in said source partition and comprising the each data row to the respective target table being stored in said target partition. The respective source table comprising the each data row and the respective target table used for inserting of the each data row are table portions of one of the data tables being stored across at least said source and said target partition and comprising the each data row. Details of this procedure are described in the process blocks 306a-306e. These process blocks are executed for the each data row to be moved.

In the process block 306a each of the compressed contiguous data records corresponding to the columns of the source table comprising the each data row are decompressed and in the process block 306b each of the contiguous compressed data records corresponding to the columns of the target table in which the each data row to be added are decompressed. Those skilled in the art will understand that the process blocks 306a and 306b can be executed in any sequence or in parallel.

It is necessary to mention that moving of one of the data rows of the entry to be moved may be performed in case when said data row has to be moved to a partition where target table does not exist. In this case the target table is created using metadata of the source table and execution of the process block 306b is not necessary.

In the process block 306c each of data entities of the each data row of the entry to be moved is moved from the respective decompressed data record of the source table to the respective decompressed data record of the target table. The respective decompressed data record of the source table and the respective decompressed data record of the target table correspond to one of the columns of the one of the data tables and the one of the columns comprises the each of the data entities, wherein each of the columns of the one of the data tables comprises the respective data entity of the each data row. Each of the data entities may be but is not limited to: the primary key, the secondary key, or the data value.

When all data entities of each data row are moved from the source table to the target table, the process blocks 306d and 306e are executed. In the process block 306d each of the decompressed contiguous data records corresponding to the columns of the source table is compressed. In the process block 306e each of the decompressed contiguous data records corresponding to the columns of the target table is compressed. Those skilled in the art will understand that the process blocks 306d and 306e can be executed in any sequence or in parallel.

Execution of the process blocks 306a and 306b can be illustrated on the aforementioned example when the order "O7" is closed. The entry/order "O7" has two rows 162 and 166 in the data tables 100 and 110 correspondingly. In order to move the rows 162 and 166 to the "Partition 1" all columns of table portions of these data tables in the "Partition 0" and the "Partition 1" have to be decompressed.

Execution of the process blocks 306c and 306b can be illustrated as a continuation of the aforementioned example. The entities of the row 162 are moved one by one from the source portion of the data table 100 in the "Partition 0" to the target portion of the data table 100 in the "Partition 1". In particular, the data entity "O7" is deleted in the decompressed contiguous data record comprising data entity "O2" in the data row 160, data entity "O6" in the data row 161, and to be deleted entity "O7" in the data row 162. The data entity is added to the decompressed contiguous data record comprising data entity "O8" in the row 167. The rest of the data entities of the row 162 are processed in the same way. The row 166 is processed in the same way as the row 162.

Execution of the process blocks 306d and 306e can be illustrated as a continuation of the aforementioned example as well. Al contiguous decompressed data records of the columns of the source and the target table portions stored in the "Partition 0" and in the "Partition 1" are compressed.

The index rows are stored in index tables. The index tables are row store tables. Each of the data rows and its corresponding index row comprise the identical primary key. Each row of each of the index tables is stored as a contiguous data record. Each of the index tables has the respective data table comprising an identical set of the primary keys as the each of the index tables. This way of storage of the index tables enables easy moving of the index rows between the first and the second storage device. The contiguous data records of the index rows are not compressed and moving of each of the index rows from one storage device to another requires processing of only one contiguous data record. As a result thereof and in contrast to the data rows the index records can be moved between storage devices at any time without overloading computer resources. The primary benefit of this solution is that a portion of the index rows stored on the first storage device can be instantly updated. This feature is important because memory space on the first storage device is much more expensive and therefore smaller than memory space on the second storage device. Storing of all index rows on the first device storage may require substantial reduction of memory space on the first storage device used for storing of the "hot" data.

Depending on particular implementation based on the discussion of possible constraints above the index allocation criterion can be selected from a group consisting of the following index allocation criteria a)-c).

a) All index rows are stored on the first storage device. This solution can be applied when the memory space of the first storage device used for storing of the index rows is not limited by any constraints.

b) The index rows corresponding to the data rows stored on the first storage device are stored on the first storage device and the index rows corresponding to the data rows stored on the second storage device are stored on the second storage device. Each of the index tables having a portion of the index rows stored on the first storage device and another portion of the index rows stored on the second storage device is stored across the first and second storage device. Each of the index tables being stored across the first storage device and the second storage device is split in two index table portions comprising the index rows stored on each of the storage devices. Each of the index table portions of the same index table have the same table metadata describing the index table, i.e. names of the columns, sequence of the columns in the table, etc. The moving of the each data row in the process block 306 further comprises moving of the contiguous data record of the respective index row comprising the same primary index as the each data row from the first storage device to the second storage device if the each data row is moved from the first storage device to the second storage device, and the moving of the each data row in the process block 306 further comprises moving of the contiguous data record of the respective index row comprising the same primary index as the each data row from the second storage device to the first storage device if the each data row is moved from the second storage device to the first storage device, wherein the index table comprising the respective index row is stored across the first storage device and the second storage device. This solution can be applied when the memory space of the first storage device used for storing of the index rows is limited and all index rows cannot be stored on the first storage device.

c) The following solution/algorithm can be used when the data volume of a data volume of the index rows is limited by a threshold data volume. After the index rows are generated in the process block 300 a sequence of process blocks 301a-301f depicted on FIG. 8 are executed.

In the process block 301a the index rows corresponding to the data rows stored on the first storage device are stored on the first storage device and the index rows corresponding to the data rows stored on the second storage device are stored the second storage device, wherein each of the index tables having a portion of the index rows stored on the first storage device and another portion of the index rows stored on the second storage device is stored across the first and second storage device. Alternatively all index rows can be stored on the second storage device, or a portion of the index rows corresponding to the data rows stored on the first storage device is stored on the first storage device if a data volume of all index rows corresponding to the data rows stored on the first storage device is above the data threshold volume, wherein a data volume of the portion of the index rows is below the threshold data volume. The index rows of this portion may be selected at random. Preferably this process block is executed before executing of any of the queries by primary key.

In the process block 301b a counter for each of the index rows is generated. This may be implemented by adding a counter column to each of the index tables. In each counter column cell of the respective index row a value of the counter of the respective index row is stored. An initial counter value of each of the counters equals to zero.

In the process block 301c queries by primary key are executed. The executing of each of the queries by primary key (Process blocks 302-304) further comprises increasing by unity of the counter value of the respective index row comprising the primary key specified in the each of the queries by primary key. The decision process block 304d cause execution of the process block 301c until an overall sum of the counter values exceeds a threshold value. The threshold value may be selected big enough in order to provide a meaningful statistics for identifying the most frequently used index rows.

When the overall sum of the of the counter values exceeds a threshold value the decision process block 301d cause execution of the process block 301e. In the process block 301e an index row set of index rows is identified. Each of the index rows of the index row set has the respective counter value higher than any of the counter values of the counters of the index rows, which do not belong to the index row set. A data volume of the index row set is below a threshold data volume. In this way the most frequently used index rows are selected into the index row set. Afterwards in the process blocks 301*f* and 301*g* the index rows are moved between the first storage device and the second storage device in order to reach a state when all of the index rows of the index row set are stored on the first storage device and the rest of the index rows are stored on the second storage device. As a result thereof the most frequently index rows are stored on the first storage device and their data volume is below the threshold data volume.

In the process block 301*f* each of the index rows of the index row set is moved from the second storage device to the first storage device if the each of the index rows of the index row set is stored on the second storage device.

In the process block 301*g* each of the index rows, which does not belong to the index row set, is moved from the first storage device to the second storage device if the each of the index rows, which does not belong to the index row set, is stored on the first storage device. The process blocks 301*f* and 301*g* can be executed in any sequence or in parallel.

Different processes may be executed on the data base, as a result thereof a list of the most frequently used index rows may change in time. Thus process blocks 301*c*, 301*e*, 301*f*, 301*g* and the decision process block 301*d* have to be repeated in order to follow the trend of changing of the list of the most frequently used index rows. In order to avoid overflow of the counter values all of the counter values are set to zero in the process block 301*h*. The process block 301*h* is executed after the process block 301*e*. Execution of the process blocks 301*f*, 301*g*, and 301*h* causes execution of the process block 301*c* if the next iteration, wherein the next index row set of the most frequently used index rows needs to be determined, has to be executed.

The invention claimed is:

1. A system comprising:
   a first storage device;
   a second storage device, wherein a database, containing entries, is stored across partitions, the first storage device comprises one partition of the partitions, the second storage device comprises the other partitions except the one of the first storage device, each of the partitions having a respective partition identification for identification of that partition, wherein each of the entries is stored in one or more data rows of data tables stored in the database, wherein each of the data rows comprises a respective primary key for identification of that data row, wherein each of the entries comprises at least one data value indicative of allocation of the each of the entries in one of the partitions; and
   a computing device comprising:
   a memory storing processor-executable program code, and
   a computer processor to execute the processor-executable program code in order to cause the computing device to:
      generate, for each of the primary keys, a respective index row comprising the respective primary key and the partition identification associated with said respective primary key; and
      execute a query by primary key on the database, wherein one of the primary keys is specified in the query by primary key, wherein the executing of the query by primary key comprises:
         identifying the partition identification associated with the specified primary key using the index rows; and
         executing a query by primary key on the partition having the identified partition identification using the specified primary key,
   wherein each of some or all of the data tables are stored across partitions,
   wherein each of the tables being stored across partitions is split in table portions comprising the data rows stored in each of the partitions across which the each of the tables is stored,
   wherein the data tables are column store data tables, wherein each column of each of the data tables stored only in one of the partitions is stored as a contiguous compressed data record in the only one of the partitions,
   wherein each column of each of the table portions stored in the respective partition is stored as the contiguous compressed data record in the respective partition, and
   wherein the index rows are stored in index tables, the index tables are row store tables, and each row of each of the index tables is stored as a contiguous data record.

2. The system of claim 1, wherein an access time of the first storage device is shorter than an access time of the second storage device.

3. A system comprising:
   a first storage device;
   a second storage device, wherein a database, containing entries, is stored across partitions, the first storage device comprises one partition of the partitions, the second storage device comprises the other partitions except the one of the first storage device, each of the partitions having a respective partition identification for identification of that partition, wherein each of the entries is stored in one or more data rows of data tables stored in the database, wherein each of the data rows comprises a respective primary key for identification of that data row, wherein each of the entries comprises at least one data value indicative of allocation of the each of the entries in one of the partitions; and
   a computing device comprising:
   a memory storing processor-executable program code, and
   a computer processor to execute the processor-executable program code in order to cause the computing device to:
      generate, for each of the primary keys, a respective index row comprising the respective primary key and the partition identification associated with said respective primary key; and
      execute a query by primary key on the database, wherein one of the primary keys is specified in the query by primary key, wherein the executing of the query by primary key comprises:
         identifying the partition identification associated with the specified primary key using the index rows; and
         executing a query by primary key on the partition having the identified partition identification using the specified primary key,
   wherein the execution of the processor-executable code by the computer processor further causes the computing device to:
      store at least a portion of the index rows on the first storage device, and store all index rows, which are not stored on the first storage device, on the second storage device, wherein the index rows stored on the first storage device comply with an index allocation criterion, wherein the identifying of the partition identification associated with the specified primary key is performed using the index rows stored on the first storage device if the index rows stored on the first storage device comprise the specified primary key otherwise the identifying of the partition identification associated with the specified primary key is performed using the index rows stored on the second storage device.

4. The system of claim 3, wherein the execution of the processor-executable code by the computer processor further causes the computing device to:

modify the one or more indicative data values of the entry; and move the entry to the target partition when at least one data value indicative of allocation of the entry to be moved is modified and the at the least one modified data value indicates that the entry has to be moved to the target partition from the source partition in which the entry is currently stored, wherein all index rows comprising the respective primary keys of the data rows of the entry to be moved are updated after the entry to be moved is moved, wherein in each of the updated index rows the partition identification of the source partition is substituted by the partition identification of the target partition, wherein the source partition is one of the partitions and the target partition is another one of the target partitions.

5. The system of claim 4, wherein each of some or all of the data tables are stored across partitions, wherein each of the tables being stored across partitions is split in table portions comprising the data rows stored in each of the partitions across which the each of the tables is stored, wherein the data tables are column store data tables, wherein each column of each of the data tables stored only in one of the partitions is stored as a contiguous compressed data record in the only one of the partitions, wherein each column of each of the table portions stored in the respective partition is stored as the contiguous compressed data record in the respective partition, wherein the moving of the entries is performed only in predetermined non-overlapping time intervals, wherein the moving of the entry from its source partition to its target partition comprises moving each data row of the entry to be moved from the respective source table being stored in said source partition and comprising the each data row to the respective target table being stored in said target partition, wherein the respective source table comprising the each data row and the respective target table used for inserting of the each data row are table portions of one of the data tables being stored across at least said source and said target partition and comprising the each data row, wherein the moving of the each data row comprises:

decompressing each of the compressed contiguous data records corresponding to the columns of the source table;

decompressing each of the contiguous compressed data records corresponding to the columns of the target table;

moving each of data entities of the each data row from the respective decompressed data record of the source table to the respective decompressed data record of the target table, wherein the respective decompressed data record of the source table and the respective decompressed data record of the target table correspond to one of the columns of the one of the data tables and the one of the columns comprises the each of the data entities, wherein each of the columns of the one of the data tables comprises the respective data entity of the each data row, wherein the each data entity is the primary key, or a secondary key, or the data value;

after the moving of the each of the data entities compressing each of the decompressed contiguous data records corresponding to the columns of the source table; and after the moving of the each of the data entities compressing each of the decompressed contiguous data records corresponding to the columns of the target table.

6. The system of claim 5, wherein the index rows are stored in index tables, the index tables are row store tables, each of the data rows and its corresponding index row comprise the identical primary key, each row of each of the index tables is stored as a contiguous data record, each of the index tables has the respective data table comprising an identical set of the primary keys as the each of the index tables, wherein the index allocation criterion is selected from a group consisting of the following index allocation criteria a)-c):

a) all index rows are stored on the first storage device;

b) the index rows corresponding to the data rows stored on the first storage device are stored on the first storage device and the index rows corresponding to the data rows stored on the second storage device are stored on the second storage device, wherein each of the index tables having a portion of the index rows stored on the first storage device and another portion of the index rows stored on the second storage device is stored across the first and second storage device, wherein the moving of the each data row further comprises moving of the contiguous data record of the respective index row comprising the same primary index as the each data row from the first storage device to the second storage device if the each data row is moved from the first storage device to the second storage device, wherein the moving of the each data row further comprises moving of the contiguous data record of the respective index row comprising the same primary index as the each data row from the second storage device to the first storage device if the each data row is moved from the second storage device to the first storage device, wherein the index table comprising the respective index row is stored across the first storage device and the second storage device;

c) the index rows corresponding to the data rows stored on the first storage device are stored on the first storage device and the index rows corresponding to the data rows stored on the second storage device are stored the second storage device before the executing of any of the queries by primary key, wherein each of the index tables having a portion of the index rows stored on the first storage device and another portion of the index rows stored on the second storage device is stored across the first storage device and the second storage device, wherein the execution of the processor-executable code by the computer processor further causes the computing device to:

generate a counter for each of the index rows, wherein an initial counter value of each of the counters equals to zero, wherein the executing of each of the queries by primary key further comprises increasing by unity of the counter value of the respective index row comprising the primary key specified in the each of the queries by primary key; and after an overall sum of the counter values exceeds a threshold value perform the following:
identifying an index row set of index rows, wherein each of the index rows of the index row set has the respective counter value higher than any of the counter values of the counters of the index rows, which do not belong to the index row set, and a data volume of the index row set is below a threshold data volume;
moving each of the index rows of the index row set from the second storage device to the first storage device if the each of the index rows of the index row set is stored on the second storage device;
moving each of the index rows, which does not belong to the index row set, from the first storage device to the second storage device if the each of the index rows, which does not belong to the index row set, is stored on the first storage device; and
after the identifying of the index row set stetting all of the counter values to zero.

7. The system of claim 6, wherein each of some or all of the data rows comprises one or more secondary keys, each of the secondary keys identifies a respective data row set of the data rows, wherein each of the index rows of the respective primary key further comprises all secondary keys of the data row comprising the respective primary key if the data row comprising the respective primary key comprises at least one of the secondary keys, wherein the execution of the processor-executable code by the computer processor further causes the computing device to:
execute a query by secondary key on the database, wherein one of the secondary keys is specified in the query by secondary key, wherein the executing of the query by secondary key comprises:
identifying all of the partition identifications stored in the index rows comprising the specified secondary key; and
executing a query by secondary key on all of the partitions having their partition identification identified using the specified secondary key.

8. A computer-implemented method for providing access to a database on a system, wherein the database, comprising entries, is stored across partitions, the system comprising a first storage device, a second storage device, and a computing device, the first storage device comprising one partition of the partitions, the second storage device comprising the other partitions except the one of the first storage device, each of the partitions having a respective partition identification for identification of that partition, wherein each of the entries is stored in one or more data rows of data tables stored in the database, wherein each of the data rows comprises a respective primary key for identification of that data row, wherein each of the entries comprises at least one data value indicative of allocation of the each of the entries in one of the partitions, wherein the computing device comprises a memory storing processor-executable program code and a computer processor to execute the processor-executable program code in order to cause the computing device to perform the computer-implemented method, the computer-implemented method comprising:
generating, for each of the primary keys, a respective index row comprising the respective primary key and the partition identification associated with said respective primary key; and
executing a query by primary key on the database, wherein one of the primary keys is specified in the query by primary key, wherein the executing of the query by primary key comprises:
identifying the partition identification associated with the specified primary key using the index rows; and
executing a query by primary key on the partition having the identified partition identification using the specified primary key,
wherein each of some or all of the data tables being stored across at least two partitions,
wherein each of some or all of the data tables are stored across partitions, wherein each of the tables being stored across partitions is split in table portions comprising the data rows stored in each of the partitions across which the each of the tables is stored,
wherein the data tables are column store data tables, wherein each column of each of the data tables stored only in one of the partitions is stored as a contiguous compressed data record in the only one of the partitions, wherein each column of each of the table portions stored in the respective partition is stored as the contiguous compressed data record in the respective partition,
wherein each column of each of the table portions stored in the respective partition is stored as the contiguous compressed data record in the respective partition, and
wherein the index rows are stored in index tables, the index tables are row store tables, and each row of each of the index tables is stored as a contiguous data record.

9. The computer-implemented method of claim 8, wherein an access time of the first storage device is shorter than an access time of the second storage device.

10. The computer-implemented method of claim 9, further comprising:
storing at least a portion of the index rows on the first storage device, and storing all index rows, which are not stored on the first storage device, on the second storage device, wherein the index rows stored on the first storage device comply with an index allocation criterion,
wherein the identifying of the partition identification associated with the specified primary key is performed using the index rows stored on the first storage device if the index rows stored on the first storage device comprise the specified primary key otherwise the identifying of the partition identification associated with the specified primary key is performed using the index rows stored on the second storage device.

11. The computer-implemented method of claim 10, wherein each of the entries comprises at least one data value indicative of allocation of the each of the entries in one of the partitions, the computer-implemented method further comprising:
modifying the one or more indicative data values of the entry; and
moving the entry to the target partition if at least one data value indicative of allocation of the entry to be moved is modified and the at the least one modified data value indicates that the entry has to be moved to the target partition form the source partition in which it is currently stored, wherein all index rows comprising the respective primary keys of the data rows of the entry to be moved are updated after the entry to be moved is moved, wherein in each of the updated index rows the partition identification of the source partition is substituted by the partition identification of the target partition, wherein the source partition is one of the partitions and the target partition is another one of the target partitions.

12. The computer-implemented method of claim 11, wherein the moving of the entries is performed only in predetermined non-overlapping time intervals, wherein the moving of the entry from its source partition to its target partition comprises moving each data row of the entry to be moved from the respective source table being stored in said source partition and comprising the each data row to the respective target table being stored in said target partition, wherein the respective source table comprising the each data row and the respective target table used for inserting of the each data row are table portions of one of the data tables being stored across at least said source and said target partition and comprising the each data row, wherein the moving of the each data row comprises:
  decompressing each of the compressed contiguous data records corresponding to the columns of the source table;
  decompressing each of the contiguous compressed data records corresponding to the columns of the target table;
  moving each of data entities of the each data row from the respective decompressed data record of the source table to the respective decompressed data record of the target table, wherein the respective decompressed data record of the source table and the respective decompressed data record of the target table correspond to one of the columns of the one of the data tables and the one of the columns comprises the each of the data entities, wherein each of the columns of the one of the data tables comprises the respective data entity of the each data row, wherein the each data entity is the primary key, or a secondary key, or the data value;
  after the moving of the each of the data entities compressing each of the decompressed contiguous data records corresponding to the columns of the source table; and
  after the moving of the each of the data entities compressing each of the decompressed contiguous data records corresponding to the columns of the target table.

13. The computer-implemented method of claim 12, wherein each of the data rows and its corresponding index row comprise the identical primary key, each of the index tables has the respective data table comprising an identical set of the primary keys as the each of the index tables, wherein the index allocation criterion is selected from a group consisting of the following index allocation criteria a)-c):
  a) all index rows are stored on the first storage device;
  b) the index rows corresponding to the data rows stored on the first storage device are stored on the first storage device and the index rows corresponding to the data rows stored on the second storage device are stored on the second storage device, wherein each of the index tables having a portion of the index rows stored on the first storage device and another portion of the index rows stored on the second storage device is stored across the first and second storage device, wherein the moving of the each data row further comprises moving of the contiguous data record of the respective index row comprising the same primary index as the each data row from the first storage device to the second storage device if the each data row is moved from the first storage device to the second storage device, wherein the moving of the each data row further comprises moving of the contiguous data record of the respective index row comprising the same primary index as the each data row from the second storage device to the first storage device if the each data row is moved from the second storage device to the first storage device, wherein the index table comprising the respective index row is stored across the first storage device and the second storage device;
  c) the index rows corresponding to the data rows stored on the first storage device are stored on the first storage device and the index rows corresponding to the data rows stored on the second storage device are stored the second storage device before the executing of any of the queries by primary key, wherein each of the index tables having a portion of the index rows stored on the first storage device and another portion of the index rows stored on the second storage device is stored across the first storage device and the second storage device,
wherein the computer-implemented method further comprises:
  generating a counter for each of the index rows, wherein an initial counter value of each of the counters equals to zero, wherein the executing of each of the queries by primary key further comprises increasing by unity of the counter value of the respective index row comprising the primary key specified in the each of the queries by primary key; and
  after an overall sum of the counter values exceeds a threshold value perform the following:
    identifying an index row set of index rows, wherein each of the index rows of the index row set has the respective counter value higher than any of the counter values of the counters of the index rows, which do not belong to the index row set, and a data volume of the index row set is below a threshold data volume;
    moving each of the index rows of the index row set from the second storage device to the first storage device if the each of the index rows of the index row set is stored on the second storage device;
    moving each of the index rows, which does not belong to the index row set, from the first storage device to the second storage device if the each of the index rows, which does not belong to the index row set, is stored on the first storage device; and
    after the identifying of the index row set stetting all of the counter values to zero.

14. The computer-implemented method of claim 13, wherein each of some or all of the data rows comprises one or more secondary keys, each of the secondary keys identifies a respective data row set of the data rows, wherein each of the index rows of the respective primary key further comprises all secondary keys of the data row comprising the respective primary key if the data row comprising the respective primary key comprises at least one of the secondary keys, wherein the computer-implemented method further comprises:
  executing a query by secondary key on the database, wherein one of the secondary keys is specified in the query by secondary key, wherein the executing of the query by secondary key comprises:
    identifying all of the partition identifications stored in the index rows comprising the specified secondary key; and executing a query by secondary key on all of the partitions having their partition identification identified using the specified secondary key.

15. A computer readable medium having stored thereon a computer executable program code for execution by a computer processor controlling a computing device of a system, the system comprising a first storage device, a second storage device, and the computing device, wherein execution of the instructions of the executable program code causes the computing device to perform the computer-implemented method of claim 8 on the system.

* * * * *